United States Patent [19]
Lundquist

[11] Patent Number: 5,375,778
[45] Date of Patent: Dec. 27, 1994

[54] CONTINUOUS METHOD FOR RECLAIMING PLASTIC SCRAP

[76] Inventor: Lynn C. Lundquist, 10833 NE. Russell, Portland, Oreg. 97220

[21] Appl. No.: 72,185

[22] Filed: Jun. 7, 1993

Related U.S. Application Data

[63] Continuation-in-part of Ser. No. 781,085, Oct. 21, 1991, abandoned.

[51] Int. Cl.⁵ .............................................. B02C 19/14
[52] U.S. Cl. ........................................ 241/24; 241/20; 241/19
[58] Field of Search .................. 241/20, 24, DIG. 38, 241/99, DIG. 31, 19; 209/12, 13; 162/4

[56] References Cited
U.S. PATENT DOCUMENTS

| | | | |
|---|---|---|---|
| 4,160,722 | 7/1979 | Marsh | 241/20 X |
| 4,306,835 | 3/1985 | Tsai | 241/20 |
| 4,379,525 | 4/1983 | Norwicki et al. | 241/20 |
| 4,728,045 | 3/1988 | Tomaszek | 241/24 X |
| 4,830,188 | 5/1989 | Hannigan et al. | 209/3 |
| 5,084,135 | 1/1992 | Brooks et al. | 162/4 |

Primary Examiner—Douglas D. Watts
Attorney, Agent, or Firm—Lynn Lundquist

[57] ABSTRACT

A continuous process for reclaiming plastic scrap is disclosed. The process is particularly suited to reclaiming blow molded plastic containers which are contaminated with affixed paper or plastic film product labels, and soil, food, or motor oil wastes. The process is continuous and positively conveys materials through auger-like apparatus within a closed system.

5 Claims, 7 Drawing Sheets

CONTINUOUS METHOD FOR RECLAIMING PLASTIC SCRAP

This is a continuation in part of prior application entitled CONTINUOUS PROCESS FOR RECLAIMING PLASTIC SCRAP, bearing Ser. No. 07/781,085, filed Oct. 21, 1991, and now abandoned.

BACKGROUND-FIELD OF THE INVENTION

The present invention relates to a process for the removal of contamination from plastic material, such as plastic containers, and plastic scrap prior to further processing into a finished plastic pellet. A primary objective of the invention is to develop a continuous method from the initial granulation of the plastic through converting the material into a finished plastic pellet; the method is in the form of a positive displacement, closed system. A subsequent objective of the process is to provide for the removal of each type of contaminant encountered in the reclaiming process during a specific step of the process.

BACKGROUND-DESCRIPTION OF THE PRIOR ART

Within present plastic material reclamation technology, much attention is being given to the needs of increasing the quality of the end product. Removing contamination from a plastic material prior to its re-pelletizing in an extruder is now recognized as a mandatory step in this direction.

Prior Art systems which use air classification and floatation to separate waste materials from salvageable plastic granules do not adequately remove contamination from the plastic material. Prior art techniques disclosed by Norwicki et al. (U.S. Pat. No. 4,379,525), Hannigan et al. (U.S. Pat. No. 4,830,188), March (U.S. Pat. No. 4,160,722), and Tomaszek (U.S. Pat. No. 4,728,045) are noted as systems which use floatation to separate waste from usable material.

The technology of this invention differs substantially from the above cited references which use floatation as a means of separation. Floatation by its very nature requires that the process be unconstrained. That is, floatation is effected within an open vat or unconstrained conveying system, and is classified as a non-positive displacement system. Such a system will also be referred to as an open system. Not withstanding the conveyors and auger systems employed, such a configuration produces dead spots and velocity gradients in the process. As a result, the plastic material is not positively displaced throughout the process. Open flotation vats significantly limit uniform material processing. In some cases, such as Tomaszek, open augers are used; because these augers are open, however, they do not represent a positive displacement technology. Open vats, conveyors, and the like further create extremely complex cleaning operations; the possibility of cross-contamination from the previous material is a major concern for the processor.

A full description of the terms "positive displacement" and "open system" as applied to this method will be given later.

SUMMARY OF THE INVENTION

This invention is a method of reclaiming waste plastic and is built around the positive displacement capabilities of auger systems. This method will be referred to as a closed system. The method uses an auger wash apparatus and an auger centrifugal separation apparatus to positively control the movement of material within the process at all times. The continuous contaminant removal and material drying apparatus is a closed system with positive feed and discharge based on auger technologies. When material is processed between the primary apparatus, as in the case of air or hydro classification, the conveyance of the material is within a closed, and therefore positively controlled, system. A closed system greatly aids in uniformly processing all material as it passes through the system.

The method of the invention also differs from the prior art in its arrangement as a continuous operation. At best, the prior art represents a series of batch processes using equipment which is inter-connected with conveyors and the like. The apparatus and method of the invention is truly continuous because, from the initial granulation step to the final pelletization step, the material is positively moved from one stage to a subsequent stage in a uniform flow. It is also truly continuous in that no material is handled outside of the process flow. That is, material is not removed from a first batch and loaded into a second batch either manually or mechanically. The material continuously, and progressively, proceeds from one process to the next within a closed system.

Finally, this technology differs from the prior art in its simplicity. The method using auger technology greatly reduces the need for additional steps and batch equipment and conveying apparatus of the prior art which is required to accomplish prior art methods.

The present invention is a method of recycling or reclaiming certain plastic materials, which method may be utilized in plastic reclamation plants where large quantities of plastics are being centrally processed. The process is designed to provide continuous movement of material from the initial stage of size reduction to a final extruder pelletizing. There are no holding stages wherein material is transferred to gaylords or bins while waiting to enter a subsequent stage. All material is in transit within the process line from its induction into the size reduction step until its exits as a finished pellet from the extruder. Further, all of the process steps are arranged so that material through-put capacity is equal to that of each component of the apparatus within the system.

Specific components within this system are covered by prior U.S. Patents or patent applications such as the size reduction apparatus resulting in uniform chips, the continuous centrifugal separation apparatus, the continuous wash apparatus, and the continuous contaminant removal apparatus, which will be more particularly identified later herein.

Additional objects and advantages of the invention will become more fully apparent as the description which follows is read in conjunction with the drawings.

DETAILED DESCRIPTIONS OF THE PREFERRED EMBODIMENTS

The process of the invention, by way of an overview, generally includes the following steps:

1. Initial separation of metal waste prior to particle size reduction.
2. Size reduction through
   a. conventional plastic granulation equipment, or
   b. through the employment of equipment specifically designed to produce a uniform plastic chip dimension.
3. Classification
   a. by air may be used to remove light (air-borne) wastes, particularly when conventional plastic granulation equipment is used, or
   b. by centrifugal separation to remove liquid wastes, particularly automotive oils and the like which have their own value as a reclaimed product. Reclaiming or concentrating a liquid has the added value of removing the liquid waste from the waste water system.
4. Continuous washing in an auger washing apparatus which employs high pressure water or steam impingement in conjunction with a detergent on the plastic material.
5. Effluent separation from the washing process which results in:
   a. soluble and suspended waste removed with the waste water,
   b. fine waste remove from the product labels, generally comprised of plastic fines intermixed with fibrous materials and adhesives, and
   c. salvage which consists of usable plastic granulate material which is returned to the continuous wash process.
6. Hydro classification may be used to separate:
   a. salvage plastic material of a different density which is moved to another process, and/or
   b. heavy waste such as stones, metals, and the like.
7. Continuous contamination removal is used to separate:
   a. light waste comprised of plastic fines, fibrous and film label material and similar air-borne contaminants,
   b. a small percentage of reusable salvage which is returned to the process, and
   c. residual moisture from the washing process. (That is, material drying is effected prior to pelletizing.)
8. Final pelletizing of the reclaimed plastic through a screw extruder.

Figure 1:
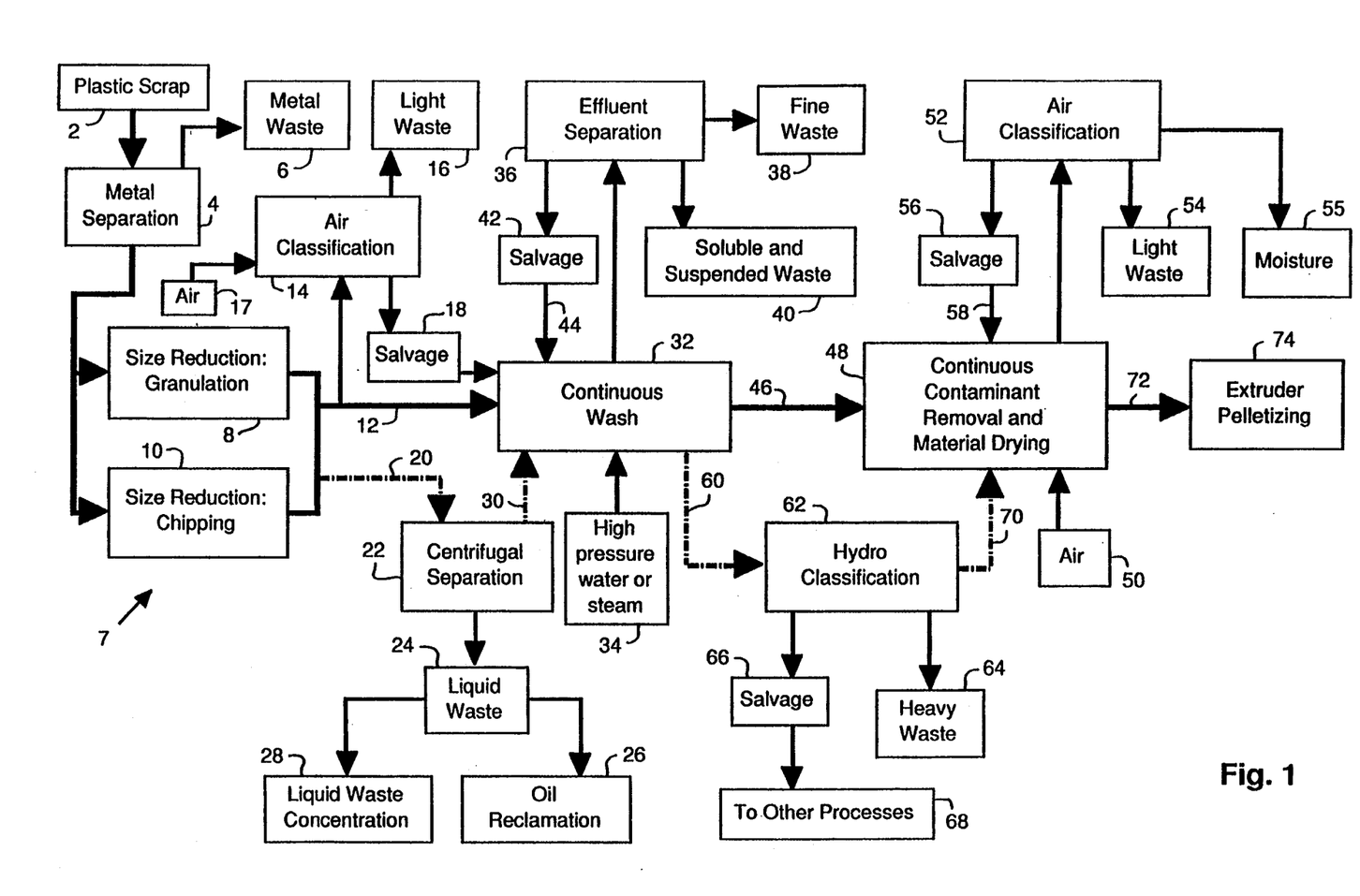
FIG. 1 is a flow chart depicting the method of the invention for reclaiming scrap plastic.

FIG. 1 depicts the process of this invention in which a quantity of plastic scrap moves from the initial size reduction stage to final pelletization. Plastic scrap 2 consisting of containers or similar plastic items which are contaminated with labels, adhesives, metal, foodstuffs, and soil is initially fed through a metal detection/separation apparatus to accomplish metal separation step 4 of the invention. Such metal detectors are commercially available, such as the metal detectors incorporated into material conveyors sold by Foremost Machine Builders, Inc. of Fairfield, N.J. Preferably, the metal separator will use inductance separation rather than magnetic separation in order to detect and separate all forms of metal. Metal waste 6 is removed at this step to protect the size reduction apparatus from damage which will occur if large metal objects inadvertently pass through the cutting chamber of the plastic material size reduction mechanism, depicted generally at 7, which includes either a granulator 8 and/or a chipper unit 10.

After the plastic material passes through metal separation step 4, the material passes into one of two size reduction mechanisms to reduce the material to a predetermined particle size. The more commonly available size reduction apparatus for plastic scrap is a plastic material granulator 8. Although this equipment is readily available, it has the disadvantage of producing a substantial percentage of fines, which are granulated plastic material which are too small to efficiently continue in the process stream. Plastic fines are more difficult to process in subsequent stages such as washing and continuous contamination removal.

The preferred size reduction apparatus is a chipper unit 10 which produces uniform chips. Two such chipper units are the subjects of U.S. Patents entitled CUTTER ENHANCEMENT FOR PLASTIC SIZE REDUCTION EQUIPMENT (U.S. Pat. No. 5,110,060) and, SECONDARY CUTTER APPARATUS FOR PLASTIC SIZE REDUCTION EQUIPMENT (U.S. Pat. No. 5,143,307) which are incorporated herein by reference.

As defined in the cited patents, "uniform plastic chips" refer to a plastic granulate which has been sized in only two dimensions, length and width, the third dimension being the already defined thickness of the raw material. The width and length are determined by the cutting geometry of the specialized plastic size reduction technology used in the process. Although the actual dimensions of the final chip will vary, it has been empirically determined that a chip having a length of approximately ¾ inch and a width of approximately ½ inch is well suited for the reclamation process described herein.

In either case, the material from the granulator 8 or the chipper unit 10 is generally conveyed to subsequent steps in the process, as indicated by line 12. At this stage in the process, the plastic has been reduced to a relatively small size, and, regardless of whether it has been chipper or granulated, will be referred to hereinafter as "granulate".

In cases where a granulator 8 is used as the chosen means of size reduction, an air classification step 14 may be added such as in a cyclone unit. In this case, high volume air 17 is driven into the process flow and is used to separate light waste 16 from the usable granulate. Light waste 16 at this point in the process flow will generally include plastic fines, plastic film product label material, and some fiber product label material with its corresponding adhesive. Inasmuch as greater effectiveness in the air classification is achieved at higher air velocities, some entrainment of usable granulate will result. Consequently, provision is made to return granulate salvage 18 to the process during the continuous wash step 32 which will be described in more detail later herein.

As indicated by the broken line 20, an optional centrifugal separation step 22 may be employed between the size reduction mechanism 7 and continuous wash step 32. (Aspects of the centrifugal separation apparatus are the subject of U.S. Pat. No. 5,160,441 entitled METHOD OF CONTINUOUS CENTRIFUGAL REMOVAL OF RESIDUAL LIQUID WASTE FROM RECYCLABLE CONTAINER MATERIAL. The centrifugal separation step 22 and apparatus 22A will be more completely explained in connection with FIG. 6.)

When motor oil containers are being reclaimed, substantial quantities of residual oil remain in the ostensibly emptied containers. Centrifugal separation step 22 is used to remove the liquid waste 24 from the granulate prior to the continuous wash step 32. In this way, not only is the liquid waste 24 removed from the waste water stream, but an oil reclamation step 26 is provided whereby the oil, which is a high value product, may be reclaimed.

In other reclamation procedures such as where soluble hazardous chemicals and the like are reclaimed, liquid waste 24 may be concentrated in a liquid waste concentration step 28 and removed from the process. (The concentration apparatus will be further described in connection with FIG. 7.)

After removal of liquid waste 24 from the granulate in centrifugal separation step 22, the granulate is conveyed to continuous wash step 32, as indicated by broken line 30.

The continuous wash step 32 uses an auger unit 40 which continuously conveys and positively displaces the granulate past fixed washing and rinsing nozzles. (The continuous wash apparatus 32A is the subject of a patent application entitled SCREW CONVEYOR WASHING METHOD FOR GRANULATED MATERIAL, Ser. No. 07/711,934. A further explanation of the continuous wash apparatus will be given in conjunction with FIG. 2.) A high pressure stream of water or steam 34 is injected into the apparatus of the continuous wash step 32. The stream entrains contaminants carried on the plastic granulate material. The residual wash and rinse liquid (generally water) is conveyed to an effluent separation step 36 where the various components are filter separated. Fine wastes 38, which generally consist of fiber materials from container labels, adhesives, plastic fines, and assorted non-soluble materials, are screened off as a waste solid. Soluble and suspended solids 40 are water-borne contaminants and are discharged into the sewage treatment stream. A certain amount of salvage 42 is allowed to be discharged with the effluent and is returned, as indicated by line 44, to the continuous wash step 32. (A number of effluent separation devices, which are suitable to accomplish affluent separation step 36, are commercially available. A unit built by SWECO, INC. of Los Angeles, Calif. is provided with a screen mesh which will grade the various components as soluble and suspended waste 40, fine waste 38, and, salvage 42.)

In one embodiment of the invention, the cleaned plastic granulate is conveyed directly from the continuous wash step 32 to a continuous contaminant removal and material drying step 48 as indicated by line 46. At this step 48, two waste components are removed as the granulate is entrained by high velocity air 50 which is injected into the apparatus as the granulate is directed through the air classification step 52 of the process. The first removed component is classified light waste 54 which includes any residual product label fibers or films which are removed by impact within the contaminant removal step 48, or which are carried into the apparatus because of moisture adhesion to the material from the continuous wash step 32. The second removed component is moisture 55, which is introduced into the process in continuous wash step 32, which is driven off in the air stream 50 from the heat and tumbling action within the continuous wash step 32. A small percentage of a third removed component is classified as salvage 56 and is also separated and returned to the process as indicated by line 58. (The continuous contaminant removal and material drying step 48 performed by a continuous contaminant removal and material drying apparatus 48A (FIG. 3), which is the subject of a patent application entitled APPARATUS FOR CONTINUOUS CONTAINER LABEL REMOVAL, Ser. No. 07/728,759, filed Jul. 8, 1991. A further explanation of the continuous contaminant removal and material drying apparatus 48A will be given in connection with FIG. 3.)

To gain the highest efficient from an air or solvent (water) elutriation system, it is necessary to have sufficient velocity within the air or solvent that some of the process material will inadvertently be entrained. It has been determined, however, that the additional equipment required to salvage the usable plastic granulate material 18, 42 and 56, is justified in the efficiency gain resulting from the enhanced removal of waste materials.

In modified embodiment of the invention, an optional stage between the continuous wash step 32 and the continuous contaminant removal step 48, as indicated by the broken line 60. In this embodiment, a hydro classification step 62 is used to separate components with a density greater than that of water from granulate components in the process stream (Hydro classification systems, which use a water medium within a cyclone to separate materials with a density less or equal to water from materials with a density greater than water, are commercially available. Such units for use in the plastics industry are supplied by companies such as KREBS ENGINEERS of Menlo Park, Calif.). This classification system may be used to remove heavy waste 64 such as metal and gravel. It may, in certain cases, be used to separate a more dense co-mingled plastic material such as PET (polyethylene terephthalate) which has a density greater than water. In this case, the salvage material 66 is directed to another process 68, which is not a subject of this application.

Properly classified plastic granulate is moved from the hydro classification step 62 to the continuous contaminant removal and material drying step 48, as indicated by broken line 70.

The final discharge from the continuous contaminant removal and material drying step 48 is conveyed to a plastic extruder for a pelletizing step 74, as indicated by line 72.

Figure 1A:
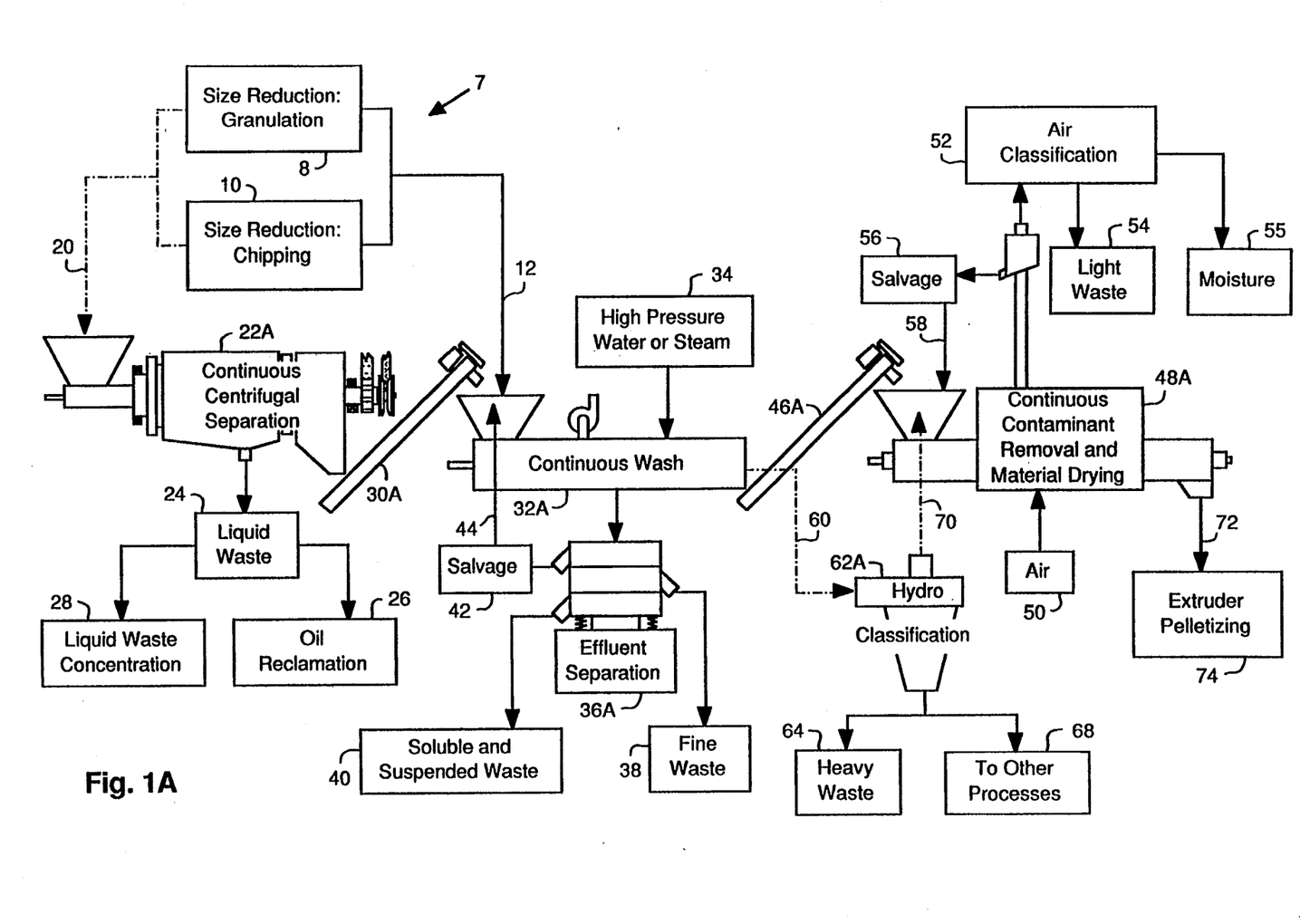
FIG. 1A is a block diagram of the method of the invention which includes a partial schematic representation of the apparatus used to practice the invention.

Referring now to FIG. 1A, the process described in connection with FIG. 1 is represented with the primary processing apparatus depicted in schematic form, with portions of FIG. 1 omitted to clarify the drawing. When the centrifugal separation step 22 is used, granulate from size reduction mechanism 7 is directed to centrifugal separation apparatus 22A, line 20. If the centrifugal separation step 22 is not used, granulate from size reduction step 7 is directed to continuous wash apparatus 32A, line 12.

Once granulate has been centrifugally separated by apparatus 22A, it is conveyed from apparatus 22A to continuous wash apparatus 32A by a first auger conveying device, 30A. Once granulate is processed in apparatus 32A, it is directed towards continuous contaminant removal and material drying apparatus 48A by second auger conveying device 46A.

Effluent from continuous wash apparatus 32A passes through effluent separation apparatus 36A, where it is separated into three components: The first component, plastic granulate salvage 42, is returned to the continuous wash apparatus 32A, as indicated by line 44. The second component is fine waste 38, which is composed of biers, adhesives and the like, and is removed for proper waste disposal. The third component is soluble and suspended waste 40, which is discharged to a waste water treatment facility.

In some instances, such as when heavy waste is contained in the granulate, or when other salvageable materials are contained in the waste, the waste is directed from continuous wash apparatus 32A to a hydro classification apparatus 62A, line 60, where heavy or salvageable material are separated from the material and are directed to other processes, step 68. After hydro-separation, the material is returned to the main process at step 48 in the continuous contaminant removal and granulate drying apparatus 48A, line 70.

It should be noted that, as used herein, the designation of this method as a closed system employing positive displacement technology assumes a precise technical meaning which will be explained later.

Figure 2:
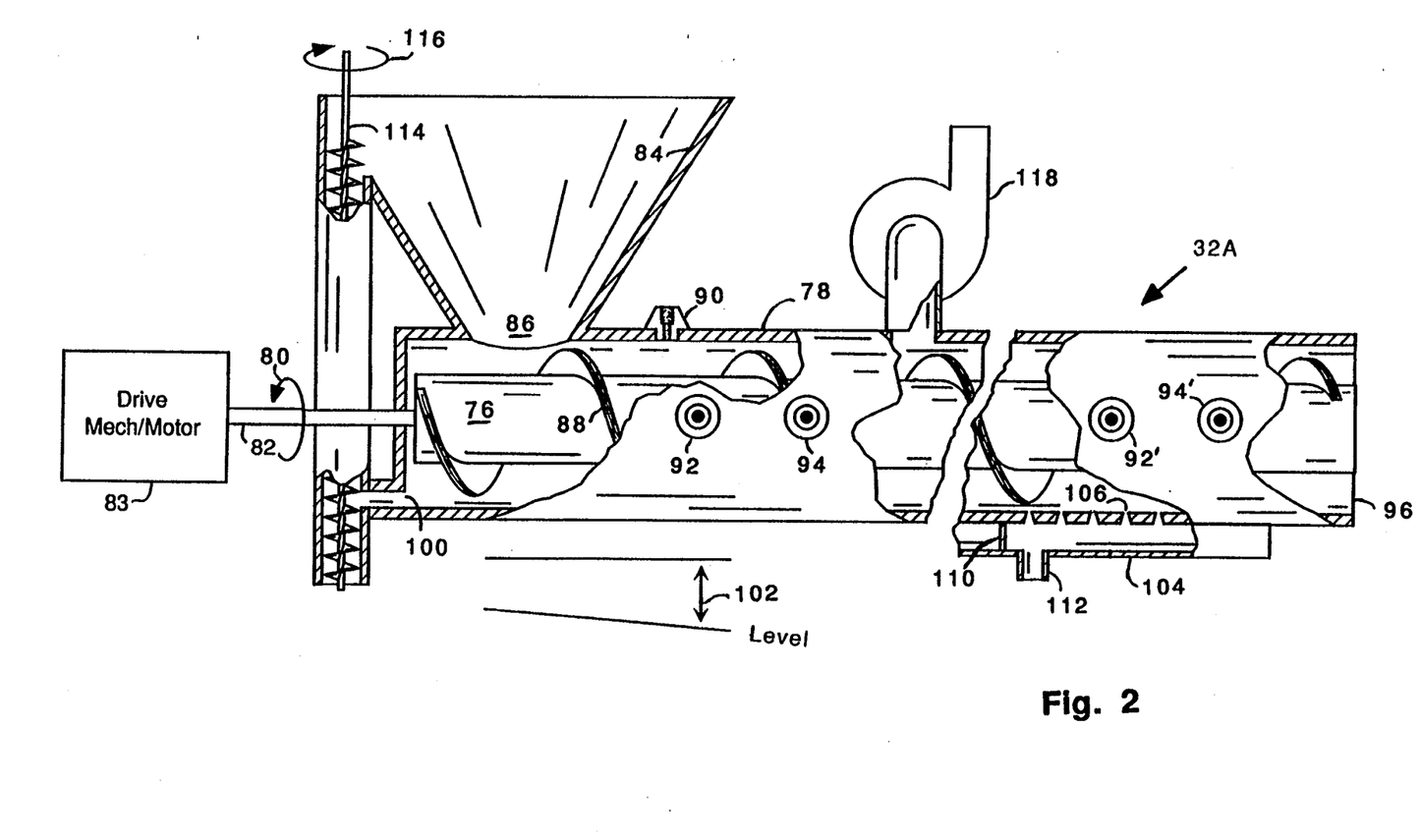
FIG. 2 is a side elevation of a continuous auger washing apparatus, with portions broken away to show detail, which is used to practice the invention.

Turning now to FIG. 2 the apparatus 32A used for continuous wash step 32, is shown. Apparatus 32A includes a continuous process auger 76 within an auger housing 78 which is driven at a substantially constant speed in direction 80 at the auger driven shaft 82 by a drive mechanism/motor 83. Granulated or chipped plastic material is fed into the feed hopper 84 and empties into the process auger 76 through the hopper throat 86.

During the washing step 32, granulate is carried the length of the auger housing 78 at a controlled rate of speed, within the confined area defined by the continuous process auger 76, the auger flights 88, and the auger housing 78.

Washing step 32 is effected by the controlled addition of a detergent material through a solvent injection nozzle(s) 90 in conjunction with a high pressure water or steam stream 34. Stream 34 impinges on the plastic granulate material as it enters the auger through plural injection nozzles 92 which are located along the length of the auger housing 78. A detergent material may also be directly added to the high pressure water or steam 34 and introduced to the process through the injection nozzles 92. A series of rinse injection nozzles 94 may also be provided through which a rinse solvent is injected. As indicated in FIG. 2, multiple stages of washing and rinsing functions may be achieved by alternating banks of solvent injection nozzles 92 and rinse injection nozzles 94. As the scrap completes it transit through the continuous wash step 32, the granulate is discharged at 96.

The solvent (generally water) from effluent separation step 36 and related materials including solubles and suspended solids 40, fine waste 38 and salvage 42 are carried away from the continuous wash apparatus through a waste water drain 100. (Gravity flow through the waste water drain 100 is achieved by mounting the entire continuous washing unit at an angle from level as indicated at 102).

In an alternate embodiment, depicted on the right side of FIG. 2, a waste water gutter 104 is located on the bottom portion of auger housing 78 in such a manner that waste water will drain through a series of waste water bleed holes 106 into the waste water gutter 104. A further refinement of this embodiment includes a gutter partition 110 and a gutter drain 112, which may be added and which will isolate a given portion of waste water from the process. In this manner, less contaminated rinse water may be recirculated to earlier washing stages which results in lower fresh water usage.

In another modified embodiment of the apparatus, a de-watering screw 114, which rotates as indicated by arrow 116, is incorporated into apparatus 32A in such a manner that salvage granulate material 42 is directly recirculated into the feed hopper 84.

When high pressure water or steam 34 is injected into continuous wash step 32, a high concentration of water vapor is produced within the auger housing 78. A first method of controlling undesirable quantities of water vapor is to inject cold water through the rinse injection nozzles 94. A second method of controlling undesirable quantities of water vapor is to provide a low pressure evacuation fan 118, which exhausts the water vapor from the apparatus.

Figure 3:
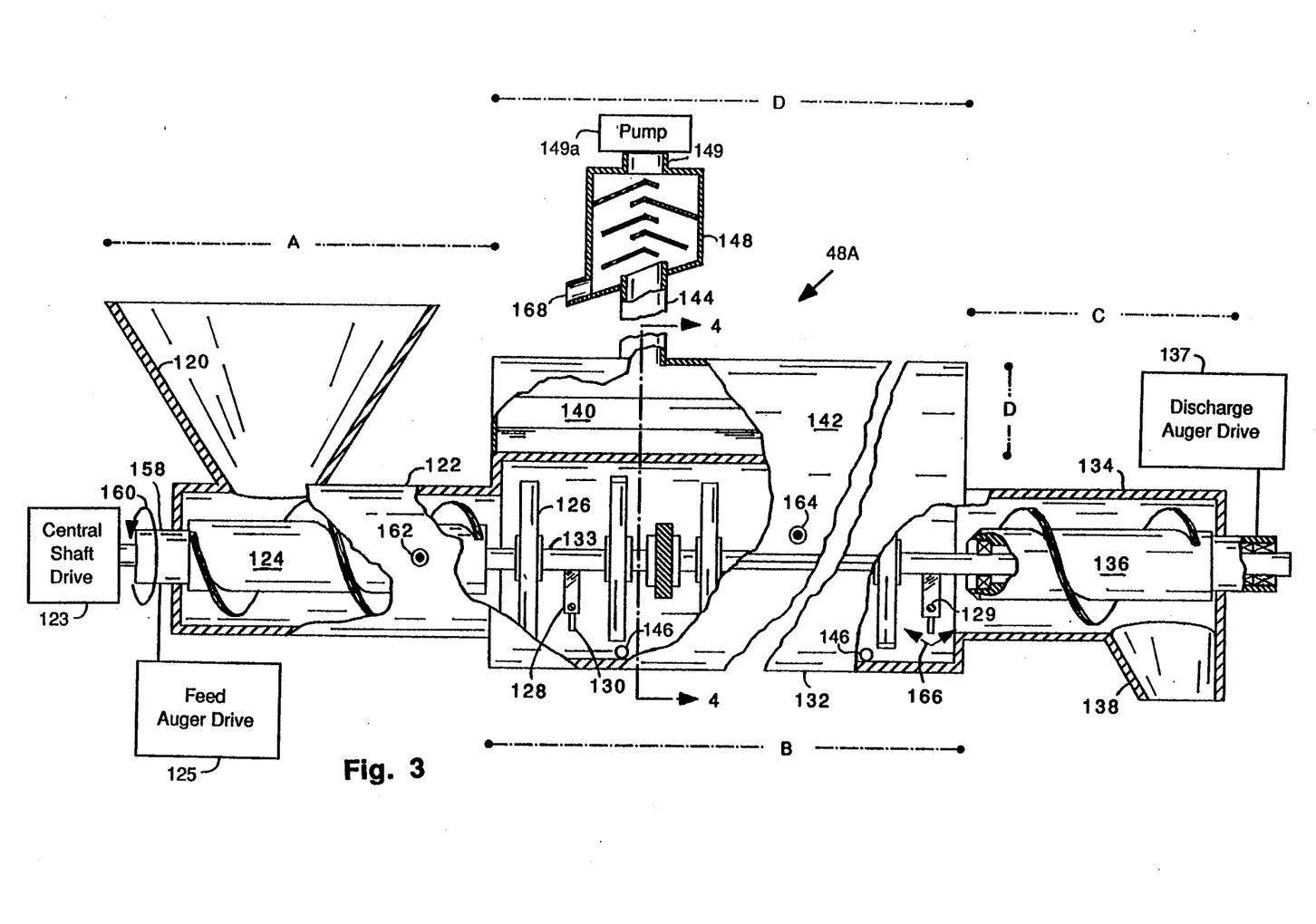
FIG. 3 is a side elevation of a continuous centrifugal separation apparatus which separates container labels from granulated or chipped plastic material, with portions broken away to show detail.
Figure 4:
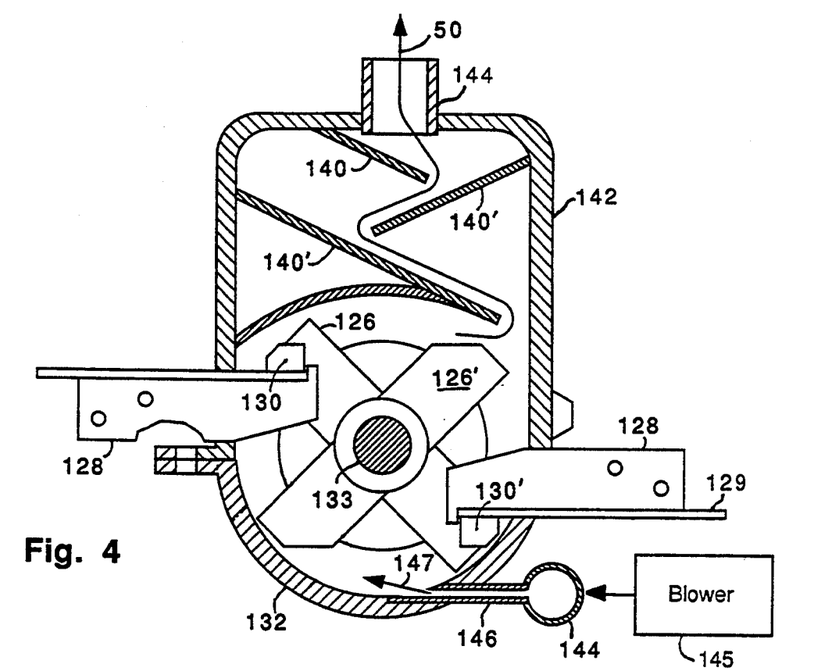
FIG. 4 is a cross section of the apparatus of FIG. 3 taken generally along line 4—3.

The apparatus used to practice the invention, as shown in FIGS. 3 and 4, is a continuous processing device designed to remove substantially dry contamination from granulated materials prior to final reprocessing. Specifically, the apparatus is designed to remove product labels affixed to plastic base materials subsequent to granulation of the intact plastic item. Such is primarily the case with blow molded plastic containers having printed paper, plastic, or other fibrous material product labels.

Referring now to FIG. 3, it can be seen that the continuous contaminant removal and drying apparatus 48A for carrying out step 48, includes four sub-sections:

A feed sub-section A includes a feed hopper 120, a feed auger housing 122, a feed auger 124, a variable speed auger drive mechanism 125, and a central shaft drive 123.

A process sub-section B includes at least one rotating member 126 which cooperates with at least one stationary member 128, to impact granulate to separate label material from the granulate. Stationary member 128 is equipped with an adjustable deflection tab 130 which allows the flow rate of granulate through the apparatus to be controlled. Process sub-section B is contained within a housing 132.

A discharge sub-section C includes a discharge auger housing 134, a discharge auger 136, a discharge variable speed auger drive mechanism 137, and a discharge chute 138.

Referring now to FIGS. 3 and 4, an air classifying sub-section D includes an air injection blower, shown at 145, for producing air stream 50, which is connected to sub-section B (FIG. 4). Contaminant removal apparatus 48A includes a series of classifier baffles 140 in a main baffle box 142. Air stream 50 exits main baffle box 142 through an air discharge duct 144, and flows through an upper baffle box 148 before being discharged at 149.

The classifier baffles 140 are arranged to direct air stream 50 into a vertical labyrinth. Air stream 50 is introduced into an air manifold 144 from a high volume blower 145. From air manifold 144, the air stream is conveyed to a series of air injectors 146 which inject air stream 50 into housing 132 at an entry point 147.

Referring to FIG. 4, a more detailed view of rotating member 126 and stationary member 128 is depicted. When more than a single rotating member 126 is mounted on the central shaft 133, the rotating members are axially mounted from between approximately twenty to ninety degrees from the mounting plane of the proceeding rotating member, as indicated by the relative positions of rotating members 126 and 126'. The rotating members cooperate with a pair of opposing stationary members 128 and 128'. A deflection tab 130, carried on control shaft 129, is provided to control the velocity of the granulate material through the process.

Figure 5:
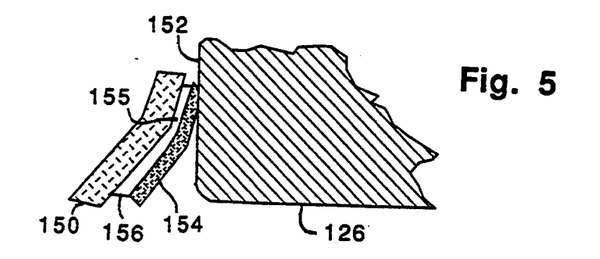
FIG. 5 is a cross section of a rotating member of the apparatus of FIG. 3 depicted interacting with a piece of contaminated granulated material.

FIG. 5 depicts a piece of granulate within the continuous contaminant removal and material drying apparatus 48A. The success of this step of the invention is dependent on a combination of physical and thermal forces generated within the process sub-section B. A piece of plastic granulate 150 is shown interacting with the leading edge 152 of the rotating member 126. The plastic granulate material 150 retains a portion of label material 154 affixed with an adhesive 156. Initially, the granulate material 150 is subjected to high impact forces as it tumbles between a high speed rotating member 126 and two cooperating stationary members 128 and 128'. In part, these high impact forces flail the label material 150 which weakens the bonding qualities of the adhesive 156, and breaks the label material into fibers, in the case of paper labels, or thin film, in the case of plastic or metalized labels.

Of equal importance, however, are certain thermal forces which take place in the adhesive layer 156. Energy released from a water-induced thermal action at 155 removes the adhesive 156, accompanied by substantial amounts of label material 154, from the plastic granulated material 150. This physical and thermal action is repeated with great frequency as the plastic granulate material 150 moves through multiple contaminant removal stages having high speed rotating members 126, 126', etc. and stationary members 128 and 128'.

It should be appreciated that although water and steam are used in the process, a "wash process", as the term is generally used, is not employed in this step of the invention. That is, a small amount of moisture is used to achieve the action which removes the adhesive. However, a larger amount of water, as would be found in a wash process, will prevent the required thermal action. The contaminant removal step also includes a drying step prior to the final extruder pelletizing step 74, in which the impacting action and the air classification is sufficient to remove surface moisture 55 from the granulate material 150.

After the removal of the label material 154, which is most commonly a fiber, and its companion adhesive 156, these lighter materials are entrained by the air stream 50, which acts as an air classification current, and are separated from the salvageable plastic granulate material 150. As the air flows through the process it entrains the lighter contaminant materials, carrying them out of the process sub-section B. As will be described in following paragraphs, further provision is made to separate salvage plastic granulate materials 56 from the discharge air flow by two classifying systems.

Contaminated granulate material 150 is fed into the feed hopper 120, passing into feed auger housing 122. Rotating feed auger 124 transports the granulate to process sub-section B. Feed auger 124 is rotated by means of a variable speed drive 125, which is coupled to a feed auger drive hub 158, which rotates as indicated by arrow 160.

Small quantities of water are added to the granulated material 150 when the adhesive 156 or label material 154 is dry. At least one water spray nozzle 162 may be incorporated into the feed sub-section A for this purpose.

Within the process sub-section B of the apparatus, the granulated material 150 passes through a series of rotating members 126 and their cooperating stationary members 128.

Water mist may be injected into the process sub-section B through a plurality of water spray nozzles 164 located on the process sub-section housing 142. The amount of water injected and the particular locations of injection will vary with the needs of the granulate material being processed.

Dwell time and holding quantity is is determined by two factors: first, the feed rates of the feed auger 124 and the discharge auger 136, which are powered by feed auger drive 125 and drive mechanism 137 respectively, are independently controlled. Various speed ratio combinations are possible which vary the quantity of material held in the process sub-section B. Operating the feed auger 124 at a slightly higher feed rate than that of the discharge auger 136 will cram-feed process sub-section B and increase dwell time. Setting the rotational speed of discharge auger 136 to exceed that of the feed auger 124 will starve-feed process sub-section B and reduce the dwell time.

Second, each stationary member adjustable deflection tab 130 is independently varied, as indicated by 166, by adjusting pivotable shaft 129 to control the rate of forward movement of the granulate material in the process sub-section B. Greater turbulence of the granulate material can also be achieved by individually adjusting the deflection tabs 130 within each stage of the process sub-section B. In some cases, the deflection tab for a given stage may be set for negative forward material travel. That is, by adjusting any given deflection tab 130, or a series of such deflection tabs, to achieve a negative direction of material flow relative to the normal flow of material in the process sub-section B, the degree of turbulence or dwell time of the material is controlled.

Referring now to FIG. 5, air classifying sub-section D includes blower 145, duct 144, and air injectors 146, to produce air stream 50, which is directed through sub-section B and the labyrinth path in baffle boxes 142 and 148. Air is injected tangentially into housing 132. As the air migrates through the housing, it entrains air-borne fiber and adhesive particles. Inasmuch as a high volume, high velocity air supply is employed, some inadvertent entrainment of granulate material 150 will occur. A series of classifier baffles 140 are positioned in housing 142 so that air stream 50 will divest itself of the entrained granulate material, which will drop back into the process sub-section B, against the flow of air stream 50.

Some salvageable granulate material 56 will remain in air stream 50 as it exits air discharge duct 144. Upper baffle box 148 is mounted above the apparatus which will finally separate the salvageable granulate material 56 from the air-borne contaminants. The air-borne light waste 54 is carried out of a final discharge 168, while the salvageable granulate material 56 is returned to the feed hopper 120 (at 58, FIG. 1).

In practice, it is desirable to maintain the air pressure within process sub-section B substantially equal to that of the ambient air pressure wherein the apparatus is employed. An air pressure with significant deviation from ambient, will cause an air flow past both the feed auger 124 and the discharge auger 136, which will entrain granulate material. Unregulated granulate material movement will impede the flow of the granulate material in either auger section and affect controllability of the process. It is therefore desirable to provide a push-pull air system to the process sub-section B. This is accomplished with a pressurized air supply directly coupled to the air manifold 144 and an air evacuation pump 149a located at final discharge area at 149. In this way, air movement in the process sub-section B is maintained at high velocity, without creating a substantially higher pressure than that of the ambient atmosphere.

An important feature of the invention is the removal of moisture 55 from the granulate material prior to its entrance into the infeed section of the extruder pelletizing apparatus 74A and the pelletization step 74 of the process. The mechanical action within the continuous contaminant removal and material drying apparatus 48A, in conjunction with the air stream 50, is operable to remove moisture from the granulate material.

Figure 6:
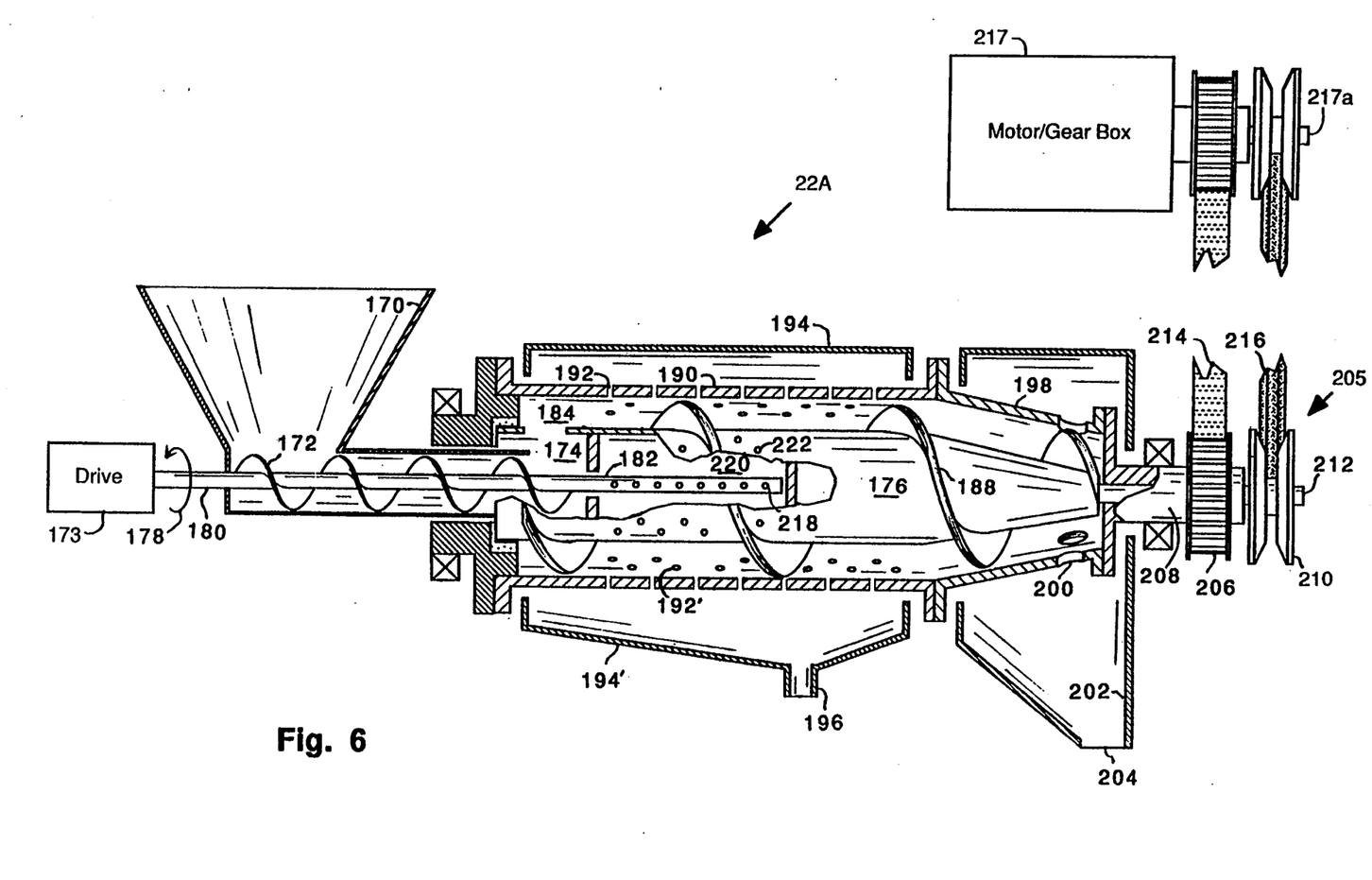
FIG. 6 is a side elevation of a continuous auger centrifugal separation apparatus which moves liquid waste from granulated or chipped plastic material, with portions broken away to show detail.

FIG. 6 depicts an apparatus 22A which is used for centrifugal separation step 22, if required. Granulated plastic scrap 2 in the form of chips or shreds, which are contaminated with residual liquid waste 24 (usually motor oil) are fed into a receiving hopper 170 from size reduction mechanism 7, broken line 20. A feed auger 172 conveys the chips or shreds into a centrifugal auger infeed chamber 174. The feed auger 172, is driven by a drive mechanism 173, independently, of the centrifugal auger 176, as indicated by arrow 178. In the preferred embodiment, a feed auger tube 180, which includes a spray bar portion 182, protrudes into centrifugal auger 176. The low speed feed auger 172 is linked neither mechanically nor rotationally with any high speed portions of the centrifuge apparatus.

As the granulate enters centrifugal auger infeed chamber 174, it is centrifugally flung from the infeed chamber into a conveying portion 184 of the centrifugal auger. Centrifugal auger flights 188 subsequently carry the granulate the length of a perforated centrifugal auger cylinder 190 by means of the relative rotational difference between the centrifugal auger and the perforated auger cylinder.

During centrifugal processing, as the granulate is moved the length of the perforated centrifugal auger cylinder 190, residual liquid waste 24 is stripped from the granulate and exits perforated centrifugal auger cylinder 190 through a series of bleed holes 192. The residual liquid waste is forced from centrifugal auger cylinder 190 and retained by a containment housing 194. Liquid waste 24 is finally drained from the lower containment housing 194' through a lower containment housing drain port 196.

In the preferred embodiment, the final stage of the centrifugal system consists of a frusto-conical portion 198. The frusto-conical portion does not have bleed holes. Any remaining residual liquid waste is carried back to the bleed holes 192 of the previous section.

At the termination of the process flow, the granulate is forced out of the centrifugal auger discharge ports 200 into a receiving shroud 202 and discharged at 204, which corresponds with broken line 30 in FIG. 1.

The drive system for the high speed rotating centrifugal auger 176 and perforated auger cylinder assembly 190, in one embodiment, includes a simple double sheave drive system, shown generally at 205. A cog drive sheave 206 is directly mounted to the drive shaft hub 208. A variable speed sheave 210, of substantially the same pulley ratio as the drive sheave 206, is mounted to centrifugal auger drive shaft 212. Both the perforated cylinder drive belt 214 and the centrifugal auger drive belt 216 are driven by a motor 217 from sheaves on the same motor shaft 217a. Consequently, the angular velocity difference between centrifugal auger 176 and perforated auger cylinder 190 is limited to the setting of the variable speed sheave 210. In such a manner, the feed rate of the granulate through the apparatus may be precisely controlled and limited to a desired through-put regardless of the rotational velocity of the entire assembly.

In some cases, a granulate is processed with a residual liquid waste 24 which must be removed with a solvent. An example is soap-contaminated detergent containers. In this instant, it is advantageous to rinse the contaminant with water. To perform a solvent rinse, feed auger tube 180 is used to convey the solvent (generally water) to the spray bar 182. Solvent discharges from the spray bar 182 by way of spray bar orifices 218, into a solvent chamber 220 within the centrifugal auger 176. Solvent within solvent chamber 220 is subsequently discharged through centrifugal auger solvent holes 222 whereupon it passes through the granulate and is discharged through the bleed holes 192.

In the case of a liquid waste produce 24 such as motor oil, the solvent rinse system is not used; the objective of the process as used with motor oil is to remove the oil uncontaminated with any solvent. A subsequent continuous wash 32 process is used to remove the trace oil contaminant from the granulate.

Figure 7:
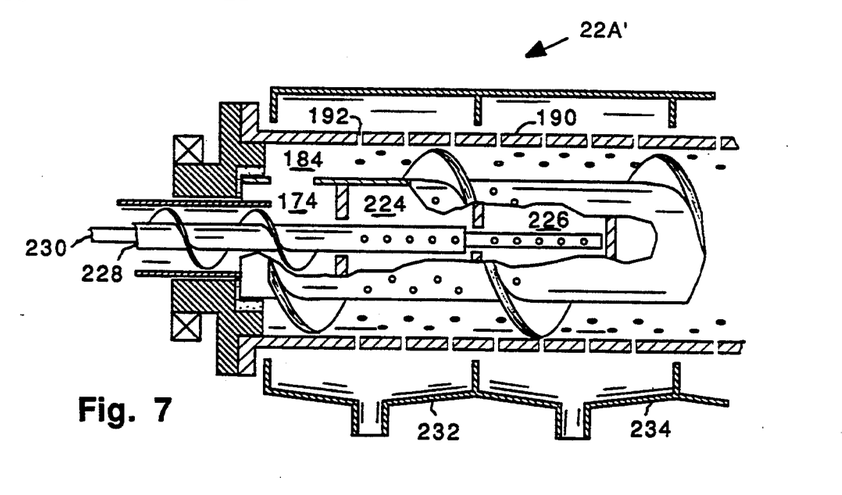
FIG. 7 is an alternate embodiment of the apparatus in FIG. 6.

FIG. 7 depicts the detail of a multi-stage solvent rinse system in a modified version of centrifugal separation apparatus 22A, which is designated as 22A'. In instances where a solvent rinse is required, there is a significant advantage in causing the solution or suspension to become as highly concentrated as possible. This is achieved by providing a multi-stage rinse apparatus and method. In this embodiment, there is provided a first solvent chamber 224 and a second solvent chamber 226. The first solvent chamber 224 is supplied by a solvent flow which enters at 228, while the second solvent chamber 226 is supplied by a solvent flow which enters at 230. Solvent and residual liquid waste removal is achieved by a first partitioned containment housing 232, a second partitioned containment housing 234, etc., as needed.

When a solvent rinse is employed, a single stage (FIG. 6), or multi-stage (FIG. 7) configuration may be provided. In a single stage application, the solvent (water, or water and soap mixtures) is injected into feed auger tube 180 and through the spray bar orifices 218. The control of the solvent material is accomplished by metering valves regulating the solvent flow as it is injected into feed auger tube 180, since all solvent immediately disperses through the granulate as the solvent passes through centrifugal auger solvent holes 222. The advantage of a solvent rinse during the process is realized in the removal of the soluble liquid contaminant 28 at high concentration levels. This alleviates a low-concentration contamination of subsequent wash cycle solvents (typically water) which must be treated in large volume to remove any contaminant. This is evident with such waste materials as soap (as will be found when reprocessing soap and detergent bottles), wherein a concentrated soap solution can be removed with the rinsing action.

As a further refinement of the solvent rinsing process, a multi-stage rinse may be used. That is, a first light rinse may be used in the first solvent chamber 224 to remove a high concentration of residual liquid waste material, which will be processed in its concentrated form. Subsequent rinses in the second solvent chamber 226 may consist of heavy usage of the rinse solvent (most likely water) being diverted to the main waste water stream. As a further aid to increasing the concentration of the first rinse, the solvent draining from the second (or last in the series) partitioned containment housing 234 may be recirculated as the solvent flow 228 to the first solvent chamber 224.

Centrifugal testing has been conducted to determine the ideal angular velocity for the apparatus. The tests were done with high density polyethylene (HDPE) oil container material contaminated with 30 weight viscosity motor oil it was determined that acceptable stripping of the oil from the plastic commences at a centrifugal force proportional to an acceleration of 330 g. It was also determined that performance of the apparatus is improved as the angular velocity is increased. A range of tests were conducted to a centrifugal force upper limit proportional to an acceleration of 1,225 g. Required process dwell time is reduced proportionately as higher radial force is applied.

A further advantage of an auger feed through the centrifugal potion of an apparatus as described herein is the continuous reorientation of the plastic or granulate material as it moves through the processing portion of the apparatus. This continuous reorientation prevents the liquid waste 24 (most notably engine oil) from remaining in pockets within the plastic or granulate material.

Special attention must be given to the terms describing this invention as a "positive displacement", and "closed system" method.

In a general sense, a positive displacement system is one in which the material being handled, either fluid or agglomerate, is held captive in such a way that movement at any point in its conveyance is entirely controlled by the conveying mechanism. That is, once a portion of the material is held within the confines of the conveying mechanism, it is physically restrained to that position in the conveying mechanism into which it is located relative only to the configuration of the conveying mechanism. In practice, with only necessary allowances for efficiency design factors, a positive displacement system moves the total intake process volume by each repetitive motion of the conveying apparatus.

In contrast, a non-positive displacement apparatus uses kinetic energy to create pressure gradients which carry the fluid or agglomerate through the process. Non-positive displacement apparatus do not move a given volume of fluid or agglomerate through the process with each repetitive motion; they impart a kinetic force to the fluid or agglomerate which will accelerate only a certain percentage of the fluid through the process with each repetitive motion.

A positive displacement apparatus is inherently a closed system. As used herein, a closed system is one which is configured in such a way that the totality of the fluid or agglomerate under conveyance is controlled throughout the process by being held captive within the method to such an extent that one hundred percent of the material is volumetrically displaced by each repetitive motion of the conveying system. Allowance in a closed system is made for machinery efficiency loses.

In contrast to the prior art, this invention employs a method and multiple apparatus based on a closed system, auger technology. The method of this invention uses positive displacement technology throughout for moving granulate material. Each given volume of granulate plastic material is volumetrically controlled and moved within a closed auger system.

Figure 8:
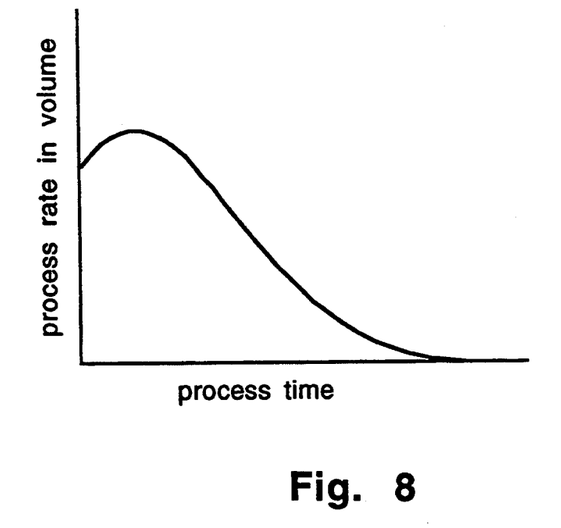
FIG. 8 is a graph depicting open system processing.
Figure 9:
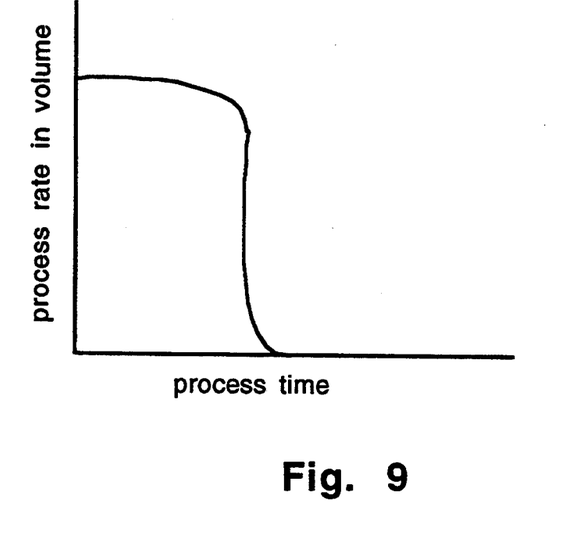
FIG. 9 is a graph depicting closed system processing.

The advantage gained with a positive displacement, closed system is shown by comparing typical process rates of a positive displacement system with that of a non-positive displacement, open system. FIG. 8 depicts the process rate, or volume passing through the process, against process time of a typical open system. FIG. 9 depicts a comparative process rate against process time of a typical closed system. Material will not pass in either system in less than the rate at which the process runs. Thus, in both cases, the left hand portion of the plot is a vertical line. However, in the case of the open system as shown in FIG. 8, the maximum through-put will be to the right of the vertical line. And further, the extreme right of the plot will represent a quantity of material which has been in the process for a considerably longer period of time than optimum cycle process time. In a closed system, however, the process rate is in direct proportion to process time. Thus, the rate will be at an optimum value adjacent to the vertical line and will then fall steeply as shown in FIG. 9.

A closed system which uses a positive displacement technology, offers considerably advantage over an open system. An open system moves the mass through the process as a random distribution. That is, for given operating parameters (auger speed, fluid viscosity, granulated plastic specific gravity, etc.) various percentages of material will pass through the system per repetitive motion. In no case within the optimum operation range will this be one hundred percent; some percentage of material will "slip". This "slip" represents the range of inefficient wherein some material will receive more than optimum process time. A distinct advantage of the closed system, which necessitates positive displacement, is that the process time can be controlled to an optimum level for the granulate which is being conveyed through the system.

While the present process has been described in conjunction with a preferred embodiment, and variations thereof, it is to be understood that various modifications and other embodiments of the present invention may be made without departing from the scope of the invention as described herein and as claimed in the appended claims.

What I claim is:

1. A method of reclaiming contaminated plastic material comprising:

separating metallic waste from the plastic material; reducing the size of said plastic material to a predetermined particle size;

centrifugally separating contaminants from said plastic material, treating said plastic material with a solvent and reclaiming contaminant from said plastic material, drying said plastic material, pelletizing said plastic material into pellets of a second predetermined size;

wherein said plastic material is positively displaced in a continuous flow in and between the steps of the process.

2. The method of claim 1 which includes continuously conveying said plastic material from one step in said process to a subsequent step in the absence of holding or batching steps within said process.

3. The method of claim 1 wherein said plastic material is positively displaced in said continuous flow in and between said steps of the process by augers.

4. The method of claim 1 which includes hydro classification of said plastic material subsequent to said process step of treating said plastic material with a solvent.

5. The method of claim 1 which includes air classification of said plastic material subsequent to said process step of drying said plastic material.

* * * * *